United States Patent [19]
Lee

[11] 4,140,029
[45] Feb. 20, 1979

[54] HYDROMECHANICAL TRANSMISSION

[76] Inventor: Shiang-Yu Lee, 2262 Longwood Cir., Wichita, Kans. 67226

[21] Appl. No.: 729,704

[22] Filed: Oct. 5, 1976

[51] Int. Cl.² ............................................. F16H 47/08
[52] U.S. Cl. .......................................... 74/688; 74/677
[58] Field of Search .......................... 74/688, 677, 730

[56] References Cited

U.S. PATENT DOCUMENTS

| | | | |
|---|---|---|---|
| 2,135,282 | 11/1938 | Fottinger | 74/688 |
| 2,147,528 | 2/1939 | Fottinger | 74/688 |
| 2,312,849 | 3/1943 | Pollard | 74/688 X |
| 2,848,906 | 8/1958 | Dodge | 74/688 X |
| 2,964,976 | 12/1960 | Kelley | 74/730 X |
| 3,027,721 | 4/1962 | Mamo | 74/730 UX |
| 3,537,260 | 11/1970 | Hobbs | 74/677 X |
| 3,789,697 | 2/1974 | Hobbs | 74/677 |

Primary Examiner—Samuel Scott
Assistant Examiner—Lance W. Chandler
Attorney, Agent, or Firm—Burns, Doane, Swecker & Mathis

[57] ABSTRACT

A Hydromechanical Transmission is disclosed which consists of a multiple turbine converter, a planetary gear set, one input shaft and one output shaft. The converter and planetary gear set are so arranged that an impeller is fastened to the ring gear of the planetary gear set. At least one turbine, which is driven directly by the input shaft, is fastened to the planet carrier; and the remaining turbines and the sun gear are splined to the output shaft. During low output speed operation, the impeller is driven by the differential action of the planetary gear set and rotates with a speed higher than that of the input shaft. Regenerative torque multiplication is achieved by the special arrangement of this invention resulting in a high torque ratio. During operation, the transmission of torque is accomplished through split mechanical and hydrodynamic paths, thereby improving both the power transmission efficiency, and the responsiveness and smoothness of operation.

4 Claims, 11 Drawing Figures

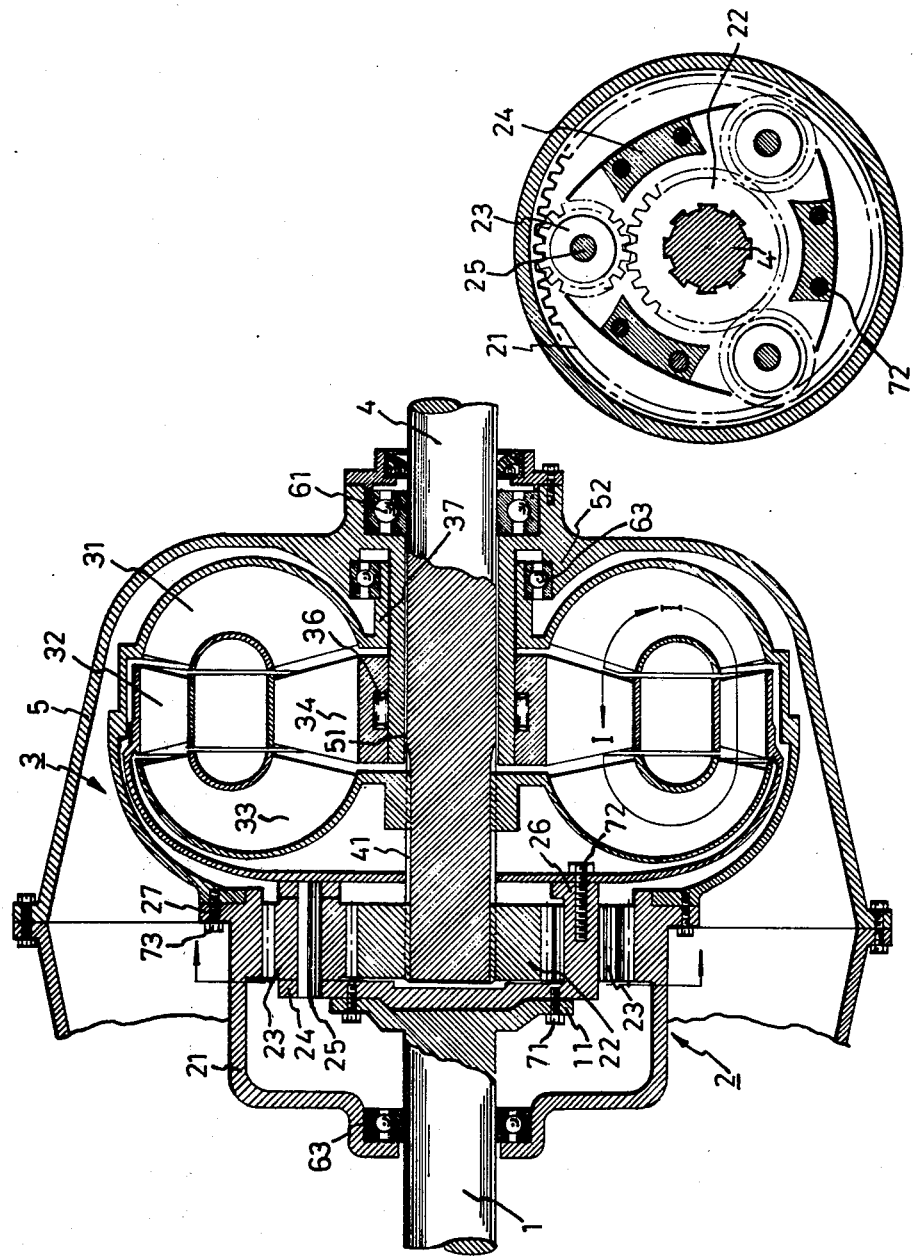

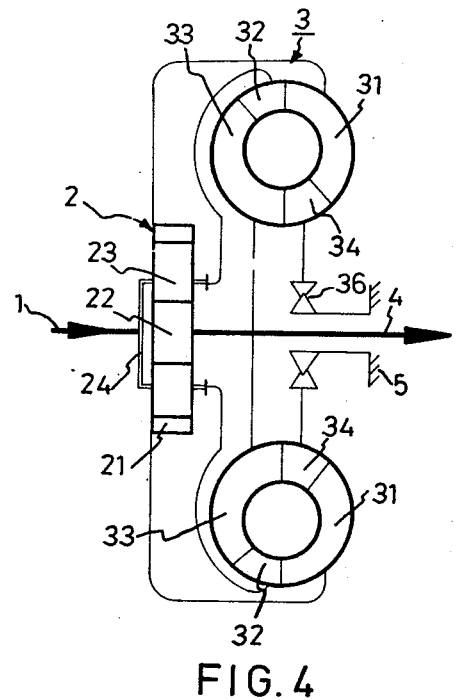
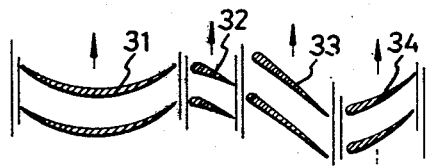
FIG. 3     FIG. 4
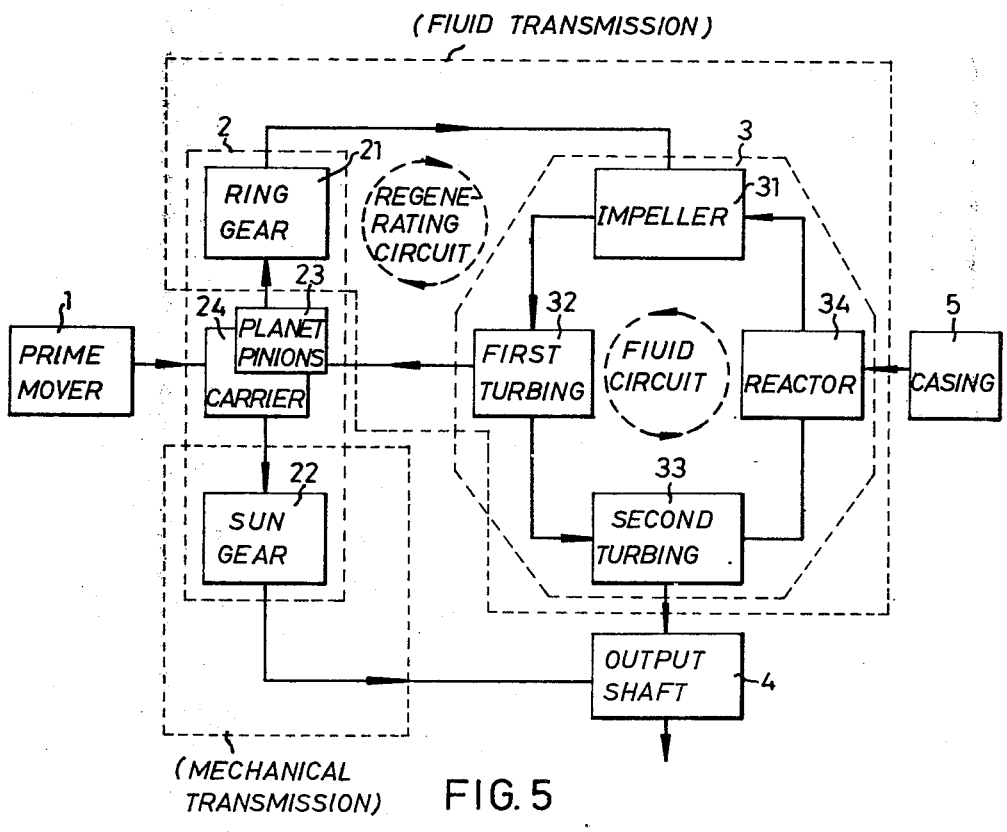
FIG. 5

HYDROMECHANICAL TRANSMISSION

FIELD OF INVENTION

This invention relates to hydromechanical transmissions, and more particularly, to a transmission system consisting of a multiple turbine converter, a planetary gear set, one input shaft, and one output shaft. The converter and planetary gear set are so arranged that an impeller is fastened to the ring gear of the planetary gear set, at least one turbine is fastened to the planet carrier which is driven directly by the input shaft, and the remaining turbines and the sun gear are splined to the output shaft. During low output speed operation, the impeller is driven by the differential action of the planetary gear set and rotates with a speed higher than that of the input shaft.

Regenerative torque multiplication is achieved by the special arrangement of this invention resulting in a high torque ratio. During operation, the transmission of torque is accomplished through split mechanical and hydrodynamic paths, thereby improving both the power transmission efficiency, and the responsiveness and smoothness of operation.

BACKGROUND OF INVENTION

Several torque converter transmissions, with planetary gearing arrangements, have been disclosed heretofore, such as U.S. Pat. Nos. 3,150,542, 3,528,321, and 3,789,697. Although differences exist in construction, they do have a common feature in that the impeller of the torque converter is connected to the input shaft and driven directly by the prime mover in such a way as to rotate with the same speed as the input shaft; therefore, when the vehicle is starting, or in low speed condition, the torque transmitted from the impeller to turbine is limited by the rotational speed. Higher stall-torque-ratio and transmission efficiency thus cannot be achieved.

Moreover, all the converters mentioned above are of a purely hydraulic type, having no mechanical bypass with low efficiencies, due to fluid splippage. Furthermore, when the engine is slowed down, or the vehicle is moving on a down-grade, the backward torque transmission capacity is small because of the small speed difference between impeller and the turbine and the absence of mechanical linkage.

In U.S. Pat. Nos. 3,425,295 and 3,503,277 the converters have both mechanical and hydraulic torque transmission paths; however, they are not effected in parallel. Purely hydraulic transmission occurs at low speed and purely mechanical transmission occurs in the high speed range. In U.S. Pat. No. 3,628,321 hydraulic and mechanical transmissions are used in parallel but only in high speed range. The aforementioned inventions all use clutches to change the modes of operation.

The invention disclosed in U.S. Pat. No. 3,163,056 employs parallel path transmission, but it does not use regenerative torque multiplication and the torque ratio is in fact reduced.

This invention eliminates the aforementioned drawbacks and brings about advantages never realized before.

SUMMARY OF INVENTION

Therefore, in view of the aforementioned, the main object of this invention is to provide a novel transmission consisting of a multi-turbine converter and a planetary gear set in which, at low output speed, the impeller is driven with input power as well as regenerative power at a speed higher than that of the prime mover, so that the torque ratio, and the torque capacity, are increased.

Another object of this invention is to provide a transmission, wherein the transmission of power is through split and parallel mechanical and hydraulic paths, thereby providing higher transmission efficiency.

A further object of this invention is to provide a transmission which, when the vehicle is slowing down or driving downgrade, provides sufficient backward torque transmission capability to effect engine braking or regenerative braking.

Still another object of this invention is to provide a torque converter of simple construction, with better responsiveness, improved smoothness of operation, and lower energy consumption.

Other objects, features, and advantages of the invention are apparent from the following detailed description of embodiments with reference to the accompanying drawings.

BRIEF DESCRIPTION OF DRAWINGS

FIG. 1 depicts a longitudinal section of a first embodiment of the invention;

FIG. 2 is a partial sectional view of the planetary gear set;

FIG. 3 is a sectional view taken along line I—I of FIG. 1, showing the vane contour of the impeller, the turbines and the reactor;

FIG. 4 is a schematic view of FIG. 1;

FIG. 5 is a block diagram of the first embodiment, showing the torque transmission circuit;

DETAILED DESCRIPTION OF EMBODIMENTS

Figure 6:
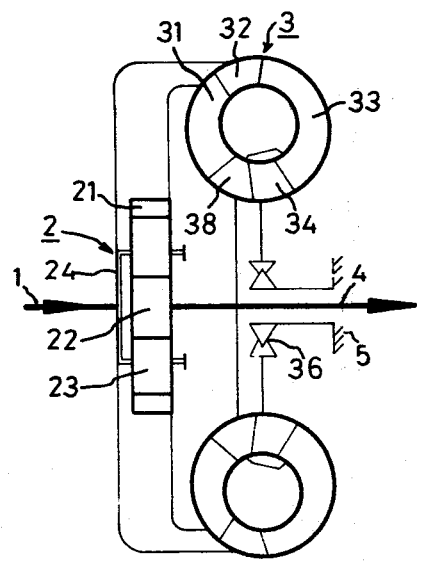
FIG. 6 is a schematic view of a second embodiment.

Referring to FIG. 1 through FIG. 4, the hydromechanical transmission of this invention consists of an input shaft (1), driven by a prime mover (not shown); a planetary gear set (2) driven by the input shaft; a multi-turbine torque converter (3) driven by the planetary gear set (2); and an output shaft (4), which is journalled in casing (5) through bearing (61) and seal (62) and is rotatable freely therein.

The planetary gear set (2) consists of a ring gear (21), rotatably mounted on shaft (1), through bearing (63); a sun gear (22) mounted through its internal spline to an external spline (41) on the inner end of the output shaft (4); a plurality of planet pinions (23), meshing simultaneously with the ring gear (21) and sun gear (22); and a planet carrier (24) for rotatably supporting the said planet pinions (23) on shafts (25). The carrier (24) is connected to flange (11) at the end of shaft (1) by bolt (71) and driven by shaft (1).

The torque converter (3) consists of an impeller (31) which is fixed on flange (27) of the ring gear (21) with bolts (73). A first turbine (32) is fastened to a flange (26) of carrier (24) by bolts (72). A second turbine (33), through its splined hub, is mounted on the external spline (41) of the output shaft (4). A reactor or stator (34), with a oneway clutch (36) is operatively mounted at the outside of a long hub (51) extending inward from the casing (5). A hub (37), of the impeller (31), extending toward casing (5) is loosely fitted outside the hub (51), and is supported rotatably on bearing (63) in the retainer (52).

The contour of the vanes corresponding to the impeller (31), first turbine (32), second turbine (33), and the reactor (34) are shown in FIG. 3, wherein the solid arrows depict their rotational directions and the dashed arrow depicts the direction of oneway braking of the reactor (34).

In operation, the prime mover drives the input shaft (1). Since the planet carrier (24) is connected to the input shaft (1) and the first turbine (32) is connected to the carrier (24), the carrier (24) and the first turbine (32) rotate with shaft (1) at the same speed. When starting, the output shaft (4) remains stationary under load. So does the sun gear (22) fixed thereon.

The ring gear (21) and the impeller (31), therefore, are driven, through the differential action of the pinions (23) and sun gear (22), to rotate at a speed higher than that of the carrier (24). The motion of impeller (31), causes its vanes to drive the motive transmission fluid toward the first turbine which is rotating with the input speed. Since its speed is lower than the speed of the impeller (31), the first turbine (32) absorbs torque from the fluid and transmits this torque to the planet carrier (24).

The carrier (24) thus receives simultaneously the torque from the prime mover input, as well as that from the first turbine (32). A larger part of the combined torque is transmitted distributively through the planetary gear set to the ring gear (21) and impeller (31), and the remaining smaller part is transmitted to sun gear (22) toward output shaft (4).

After leaving the first turbine (32), the motive fluid, still carrying considerable forward momentum, flows toward the second turbine (33) which is connected to the output shaft (4). The second turbine (33) directs the fluid to flow backward, in accordance with the turbine vane exit angle, and converts the forward fluid momentum to a positive torque, transmitting this torque directly to the output shaft (4).

When the output torque overcomes the load, output shaft (4) starts to rotate, first with a low speed and then increasing gradually to higher speeds. After leaving the second turbine (33), the transmission fluid flows through the reactor (34), with forward vane exit angle. Thereby the fluid is again diverted forwardly, converting the fluid inertia into forward momentum before re-entering impeller (31). The reactor (34) thus supplies positive torque to the transmission fluid. The magnitude of the torque supplied is in direct proportion with the torque of the impeller and is governed by the vane exit angles of the fluid parts. Furthermore the reactor torque decreases with the increase of output speed. The reactor (34), is mounted on hub (51) of casing (5) through a oneway clutch (36), and is thus prevented from rotating in the reverse direction, insuring the supply of positive torque to the fluid.

When the output shaft, together with the sun gear fixed thereon, starts rotating, the speed of ring gear (21) is decreased because of differential action. The speed of impeller (31), which is fixed on the ring gear, thus decreases with the increase of the output speed. When the output speed reaches a certain value, the back of the vanes of reactor (34) receives impingement of the forwardly flowing fluid from the second turbine exit (33) and begins to rotate forwardly to avoid the reduction of output torque and high speed operating efficiency. The input/output speed ratio at the point when the reactor starts rotating is termed as the "coupling point." Power transmission surpassing this point is then, just like that of the "fluid coupling," without the effect of torque gain.

FIG. 5 shows the block diagram of torque or power transmission in the invention. It can be seen that part of the torque passes through first turbine (32), planet carrier (24), pinion (23), ring gear (21), and impeller (31) and returns to first turbine (32) in a closed circuit. This recycling of torque is termed "torque regeneration." With proper selection of gear ratios and vane contours, it is possible to obtain a much higher regenerated torque than that being supplied by the prime mover.

It is well known in the theory of fluid machinery that a turbine operating at a speed ranging from one half speed to nearly full speed of the impeller can have very high efficiency, because of low hydraulic impact shock losses. The differential gearing arrangement, as provided by this invention, allows the first turbine (32) to operate within this range of maxium efficiency. It is conceivable that the first turbine (32) can absorb about 90% of the power transmitted from impeller (31) to the fluid. Under this situation, the total torque transmitted to impeller (31), at zero output or stall condition, would amount to several times that of the output torque of the prime mover.

As mentioned above, the torque supplied by the reactor (34) is in direct proportion to the torque of impeller (31). With proper arrangement of exit angle, the torque of reactor (34) can equal or be greater than that of the impeller (31); therefore, the combined output torque partly transmitted from pinion (23) to sun gear (22) and partly from the second turbine, according to the Law of conservation of momentum, equals the sum of the torque of the prime mover and the reactor (34) (Ref: FIG. 5). At low output speed, this output torque will be several times of that of the prime mover. According to computational results, the output torque can be as high as 7 times the input torque. To the knowledge of the inventor such a high torque multiplication has not been achieved heretofore.

In low output speed range, the high torque magnification ratio improves the transmission efficiency. Furthermore, the high torque ratio facilitates the reduction, or even elimination, of the complicated step reduction gearing and its associated clutches and servo-mechanism, thereby reducing production and maintenance costs.

Another feature of the present invention is the provision of an appropriate torque capacity. In the conventional design, with the impeller connected to the prime mover, the adoption of torque regeneration without increasing the size of impeller would cause the increase in engine stall speed, which leads to the reduction of low speed operation economy. In this invention, the impeller (31) is driven to rotate at a speed far higher than that of the prime mover. The torque capacity of the impeller (31) is consequently increased, since the torque capacity of an impeller is proportional to the square of the impeller speed. Thus, in matching the engine and converter, there is no need for drastic increase in converter size, yet a low engine stall-speed can be maintained.

Furthermore, because of the differential action, a change in engine speed results in a bigger change in impeller speed, but the torque capacity characteristics act to restrict or limit such speed changes. In other words this invention provides the desired torque change, or response, in accordance with engine throttle control, but with smaller engine speed variations. This type of operational characteristics is termed as the "tightness" of transmission in automotive engineering. While the mechanical clutch is absolutely tight, a converter or fluid coupling allows considerable variation of engine speed or, as it is commonly called, slippage.

The inherent tightness of the transmission system in this invention improves the responsiveness of the transmission to throttle control and reduces engine slippage, consequently reducing energy and fuel wastes.

When the transmission system in this invention is in operation, part of the power is transmitted mechanically through pinion (23) and sun gear (22) to output shaft (4) without energy loss, and the rest of the power is transmitted through the hydraulic path. The split and parallel path transmission of this invention improves the efficiency over that of the pure hydraulic converter transmission.

Still another feature of the present invention is the capacity of handling backward torque flow. In automotive design, it is desirable to be able to utilize the engine to absorb and dissipate some of the vehicle kinetic energy when driving down grade or slowing down. This is known as the engine braking effect. The mechanical clutch can transmit as much power back to the engine as it can absorb, but, when so doing, damaging shock loads are also indiscriminately passed on to the engine. Conventional torque converters or fluid couplings isolate these shocks from the engine but, on the other hand, could transmit very little torque backward.

In the present invention, under down hill driving conditions, when the engine slows down so does the planet carrier. Because the sun gear rotates in accordance with the vehicle wheels at a higher speed, due to vehicle inertia, the ring gear is forced to rotate even slower than the planetary carrier through differential action. Therefore, in view of the relationships between the fluid and the planetary gear set elements, the second turbine (33) rotates at a high speed, the first turbine (32) runs slower and the impeller (31) runs slowest.

In such a state of operation the fluid is driven to flow in the reversed direction where power or torque is transmitted from the second turbine to the fluid, while the first turbine and the impeller absorb torque from the fluids. The first turbine torque is transmitted directly, to the engine and the impeller torque passes through the ring gear (21) and the pinions (23) before reaching the engine.

Meanwhile, because of differential action the sun gear (22) also transmits torque to the pinions (23) and the engine in an amount proportional to the impeller and ring gear torque. Thus, the torque absorbed by the impeller in the current invention is much greater than that of a conventional converter of the same size, because the difference in speed between the output shaft and the impeller is greater in this invention.

The total torque transmitted backwards, including those from the first turbine, the impeller and directly from the sun gear, amounts to several times that which can be transmitted by a conventional torque converter. In addition, owing to the damping effect of the fluids, shock loads are still isolated from the engine.

Figure 7:
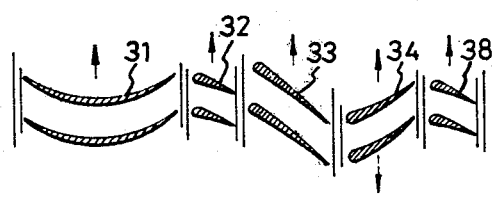
FIG. 7 depicts the vane contour of impellers of the second embodiment.

FIG. 6 shows a second embodiment, wherein a third turbine (38) is added between impeller (31) and reactor (34) of the converter. This third turbine (38) is connected to the second turbine (33), and to the output shaft (4). The rest of parts with the same numerical indications remain unchanged from the aforementioned first embodiment. The connection of the second and the third turbine (33) and (38), can be easily incorporated and is not detailed here. The vane contours are shown in FIG. 7.

Figure 8:
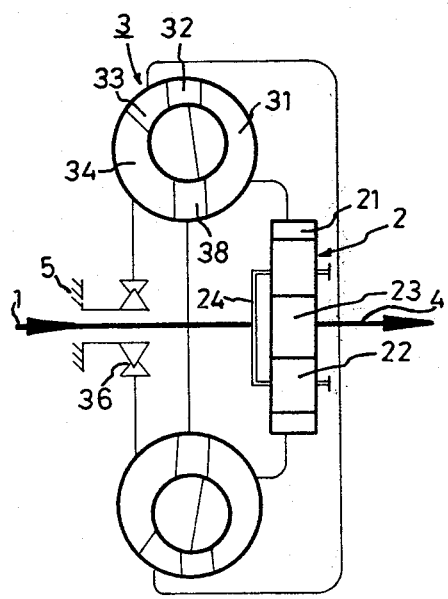
FIG. 8 is a schematic view of a third embodiment.

FIG. 8 shows a third embodiment which is somewhat like the second embodiment except that the third turbine (38) is connected to the first turbine which is directly connected to the planet carrier (24).

Figure 9:
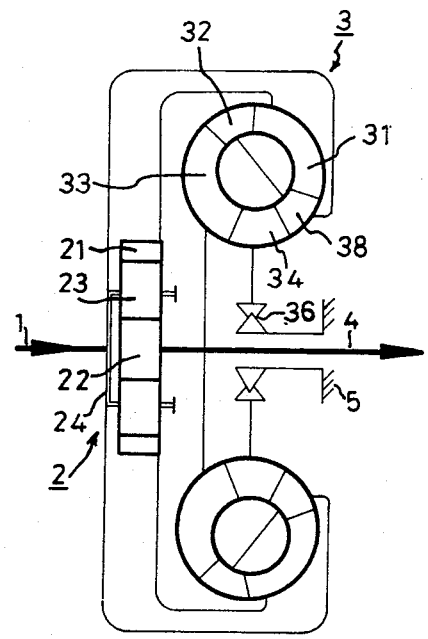
FIG. 9 is a schematic view of a fourth embodiment.

FIG. 9 shows a fourth embodiment which is very much like the third embodiment, except that the gearing mechanism (2) and the torque converter mechanism (3) are arranged in a different way.

Figure 10:
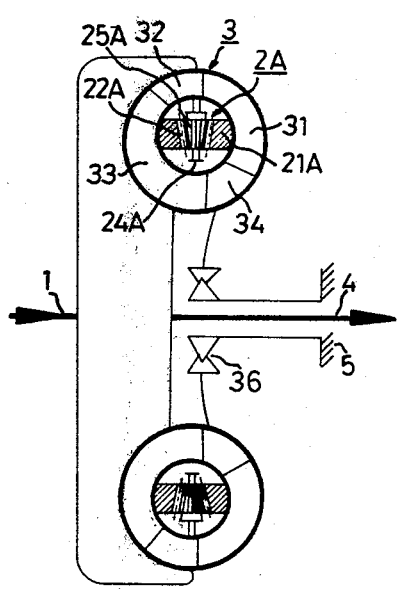
FIG. 10 is a schematic view of a fifth embodiment.

FIG. 10 shows a fifth embodiment, wherein the differential gear mechanism (2A) is disposed in the toroidal space enclosed by the fluid passage in the torque converter (3), rather than the planetary gear set (2) being disposed outside the converter (3) in the above embodiments. The said differential gear mechanism consists of a pair of bevel gears (21A) and (22A) fixed respectively to the impeller (31) and the second turbine (33), a carrier (24A) fixed to the first turbine (32), and a plurality of pinion gears (22A), which are supported with shafts (25A) rotatably mounted on the carrier (24A).

This differential gear set, including gears (21A), (22A), and (23A) and carrier (24A), functions similarly to the gears (21), (22), and (23) and carrier (24) in the above embodiments, and produces the same effects. This arrangement results in a more compact design.

Figure 11:
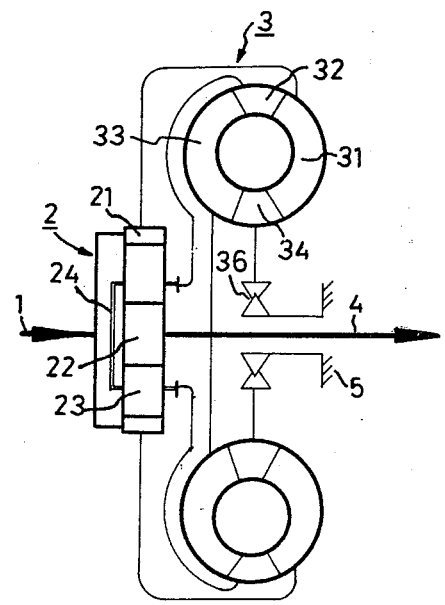
FIG. 11 is a schematic view of a sixth embodiment.

FIG. 11 shows a sixth embodiment. Wherein the input shaft (1) is connected to the ring gear (21). The first turbine (32) and the second turbine (33) are still connected to the carrier (24) and output shaft (4) respectively. According to this arrangement, a higher torque ratio can be obtained; however, the mechanical efficiency and the torque capacity are lower than in the previous cases, wherein the input shaft is connected to carrier (24).

The foregoing descriptions are the preferred embodiments of the disclosed device, and various changes and modifications may be made in the invention without departing from the spirit and scope thereof.

This inventor claims the following:

1. A hydromechanical transmission including a casing; an input shaft; an output shaft; a planetary gear set comprising a ring gear mounted for rotation relative to said input shaft, a planet carrier operably connected to the input shaft to be driven thereby, a sun gear connected to the output shaft, and a plurality of pinion gears mounted operably on the planetary carrier, said pinion gears having teeth meshing simultaneously with the ring gear and the sun gear; a multi-turbine torque converter including an impeller connected to the ring gear, at least one turbine connected to the planet carrier, at least one turbine operably connected to the output shaft, and a reactor operably mounted through an oneway cluth on a hub extension of the casing.

2. A hydromechanical transmission, according to claim 1, wherein the multiple turbine converter is characterized by a first turbine connected to the planet carrier, and a second turbine connected to the sun gear or output shaft.

3. A hydromechanical transmission, according to claim 1, wherein the multiple turbine torque converter comprising of a first turbine and a third turbine coupled together and connected to the planet carrier, and a second turbine splined to the output shaft.

4. A hydromechanical transmission in accordance with claim 1 wherein said at least one turbine operably connected to the output shaft comprises two turbines coupled together and connected to said output shaft.

* * * * *